(No Model.)
L. B. HENRY.
CULTIVATOR.
No. 421,710. Patented Feb. 18, 1890.
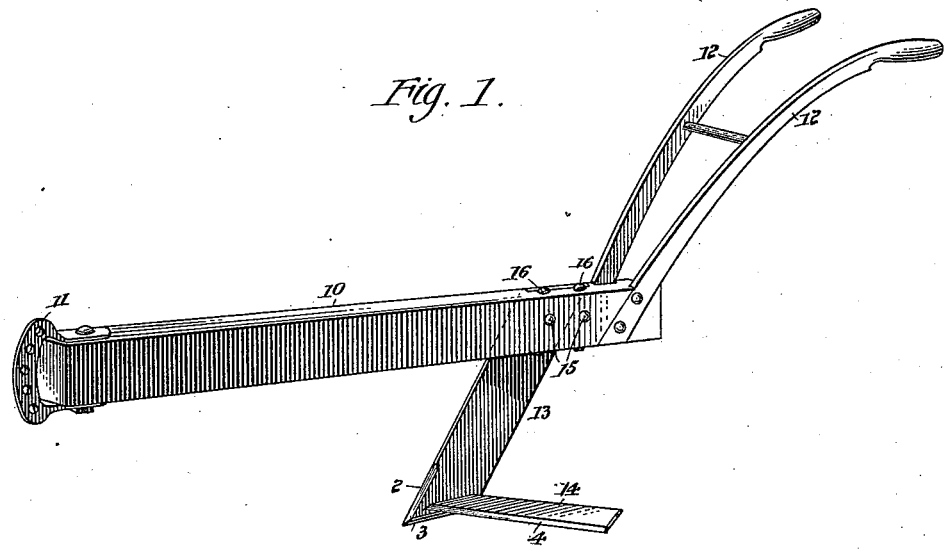
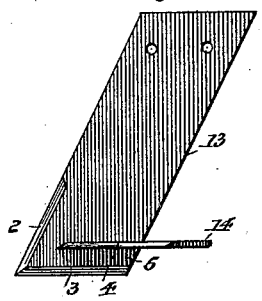
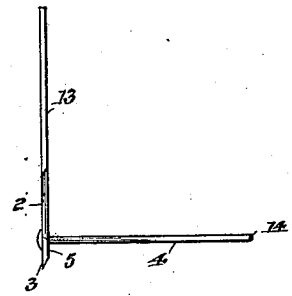
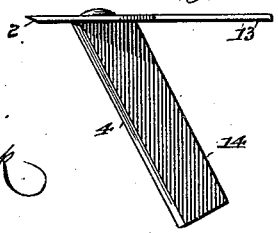
WITNESSES:
J. Clark.
C. Sedgwick
INVENTOR:
L. B. Henry
BY Munn & Co.
ATTORNEYS

UNITED STATES PATENT OFFICE.

LEROY BELL HENRY, OF AUSTIN, TEXAS.

CULTIVATOR.

SPECIFICATION forming part of Letters Patent No. 421,710, dated February 18, 1890.

Application filed November 14, 1889. Serial No. 330,293. (No model.)

*To all whom it may concern:*

Be it known that I, LEROY BELL HENRY, of Austin, in the county of Travis and State of Texas, have invented a new and Improved Cultivator, of which the following is a full, clear, and exact description.

This invention relates to cultivators, the object of the invention being to provide a cultivator which will be particularly adapted to the cultivation of young cotton-plants, although the implement may be used in connection with other crops, such as cane, beans, peas, and potatoes.

To the ends named the invention consists, essentially, of the construction and arrangement of parts hereinafter described and claimed.

Reference is to be had to the accompanying drawings, forming a part of this specification, in which similar figures of reference indicate corresponding parts in all the views.

Figure 1 is a perspective view of a cultivator embodying my invention. Fig. 2 is a side view of the blade and wing. Fig. 3 is an edge view thereof, and Fig. 4 is a plan view.

In the drawings, 10 represents a beam, which is provided with the ordinary clevis 11 and with handles 12. To this beam there is bolted or otherwise secured a blade 13, the forward edge of which is sharpened for some distance upward from the point, thus forming a cutting-edge 2, the lower edge of the blade being also sharpened, as shown at 3. To the blade 13, I rigidly connect a laterally-extending wing 14, which has a cutting-edge 4, the wing 14 being secured to the blade in a position such that the blade extends some distance downward below the wing, whereby there is formed what might be called a "keel" 5.

The implement above described may be made of different sizes, either for one or two draft-animals, and may be either right or left handed.

As the implement is drawn forward it is guided by the operator so that the blade 13 will be held in close proximity to the plants that are being cultivated, the cutting-edges of the blade and wing serving to remove all weeds and to loosen the earth without disturbing the roots of the plants.

Although any proper means might be employed for connecting the blade to the beam, I prefer that such blade be secured to the beam by means of bolts 15, which pass through the blade and beam, the beam in turn being held from splitting by bolts 16.

Having thus described my invention, I claim as new and desire to secure by Letters Patent—

In a cultivator, the combination, with a blade arranged for connection with a beam and formed with cutting-edges 2 and 3, of a wing in a horizontal plane formed with a cutting-edge 4 and rigidly connected to the blade at some distance above its lower edge, substantially as described.

LEROY BELL HENRY.

Witnesses:
E. M. HOUSE,
H. H. CHILDERS.